Figure 1:
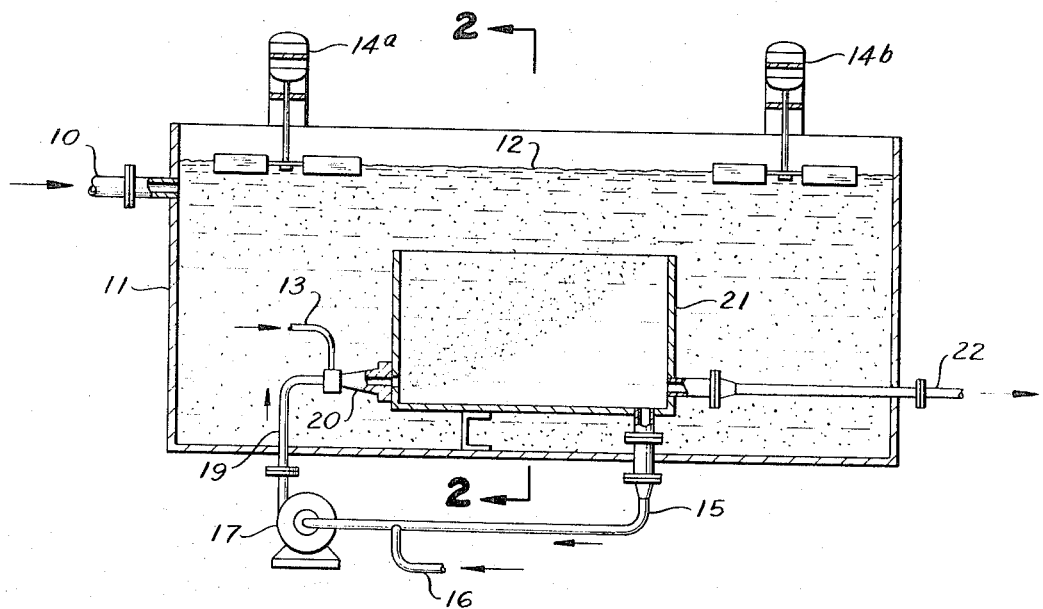

United States Patent [19]
Savage

[11] 3,788,478
[45] Jan. 29, 1974

[54] WASTE WATER TREATMENT
[75] Inventor: William E. Savage, Castro Valley, Calif.
[73] Assignee: Shell Oil Company, New York, N.Y.
[22] Filed: Aug. 19, 1971
[21] Appl. No.: 173,058

[52] U.S. Cl............... 210/197, 210/221, 210/256, 209/168
[51] Int. Cl.................... B01d 21/00, B03d 1/00
[58] Field of Search...... 210/44, 221, 256, 195–197, 210/3–8, 194; 209/168–170

[56] References Cited
UNITED STATES PATENTS
3,684,703   8/1972   Marmo ........................ 210/256 X
3,043,433   7/1962   Singer ........................... 210/221 X
3,224,964   12/1965  Derenk et al. ................. 210/221 X
3,617,539   11/1971  Grutsch ......................... 210/221 X
3,246,763   4/1966   Baum ................................ 210/221
3,298,526   1/1967   Valdespino et al. ............ 210/256 X Primary Examiner—Samih N. Zaharna
Assistant Examiner—Thomas G. Wyse
Attorney, Agent, or Firm—Norris E. Faringer; Howard W. Haworth

[57] ABSTRACT

Waste water treating process wherein aeration and separation of bacterial matter to form a clarified effluent is accomplished in a single treating zone employing a submerged flotation cell.

1 Claim, 2 Drawing Figures

WASTE WATER TREATMENT

BACKGROUND OF THE INVENTION

1. Field of the Invention

This invention relates to waste water purification. More particularly it relates to an improved method and apparatus for biologically treating waste water in basins and lagoons.

2. Prior Art

Waste water, both industrial and domestic, typically contains relatively high concentrations of dissolved organic contaminants. These components must be removed or substantially reduced prior to discharge into receiving streams in order to meet water quality standards. To accomplish this removal a variety of treating processes have been developed.

A common method for removing organic matter from waste water is through the use of activated sludge, i.e., by "biodegradation." Typically, bidegradation processes involve areation of waste water in an aeration zone, e.g., a basin, lagoon, tank or the like, in the presence of special kinds of bacteria which destroy the noxious organic contaminants. The effluents drawn from the aeration zone typically contain bacterial suspensions in a discrete or flocculated form. These bacterial suspensions must be separated from the treated waste water in order to obtain a clarified effluent. This separation is commonly accomplished in separate setting basins, ponds or tanks (e.g., circular or rectangular clarifiers) wherein the suspended bacterial solids are removed with or without the aid of coagulants. Such settling processes are relatively time consuming, require large land areas, and/or the use of expensive additives and therefore are less than satisfactory.

Air flotation processes have also been proposed to remove suspensions of bacterial matter (activated sludge) from treated aqueous waste. In a process of this type, aerated waste water containing a suspension of bacterial matter is withdrawn from the aeration zone and pressurized with air or other suitable gas, or is mixed with clarified effluent which contains gas and is then pressurized. Under pressure the unclarified treated waste is then introduced into a second separate flotation unit. In the separate flotation unit the pressure is released essentially to atmospheric thereby causing the release of minute air bubbles. As these bubbles ascend, they transport the bacterial sludge flocs and suspended solids to the surface of the liquid to form a froth layer which is continuously removed by mechanical means. A portion of this bacterial froth-layer is normally recycled to the aeration basis for use as seeding and nucleation material for bacteria growth and floc-formation. Conventional flotation processes used in effluent clarification while less time-consuming than processes employing sedimentation methods for removing suspended solids, still require a substantial amount of equipment, i.e., separate flotation units piping, pumps, etc. Moreover, during the aforementioned recycling of the froth-layer, a large portion of the bacterial flocs are destroyed and the bacteria are often killed by exposure to the atmosphere.

STATEMENT OF THE INVENTION

It has now been found that the aforementioned difficulties can be substantially reduced or overcome by effecting the aeration of waste water and separation of the resulting bacterial suspension in a single treating zone. In accordance with the present invention, separation of the bacterial suspension and recovery of clarified effluent is accomplished within the aeration zone, i.e., within the aeration basin, lagoon, tank or the like, by the use of one or more flotation cells submerged within the aeration basin. By this method, the froth formed in a flotation unit is immediately emitted into the surrounding bacterial suspension in the aeration basin. Thus, the present invention offers the advantage of transferring the bacteria directly into the environment most favorable for their growth without any intermediate recycling step: Because aeration and separation are effected in a single treating zone, the use of large additional areas for settling basins, etc., is avoided. Moreover, separation equipment requirements are substantially reduced thus providing additional economic benefits. This invention also provides the advantages that any air used for flotation also serves to aerate the basin as well as yielding a water purification process which is adaptable to irregularly shaped basins, ponds and the like.

Figure 2:
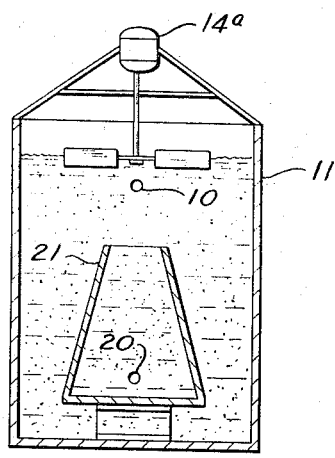

The present invention will be described in detail with reference to the accompanying drawings wherein FIG. 1 is a more or less diagrammatic elevational cross-section of one form the treating apparatus of this invention may take and FIG. 2 is another elevational cross-section of the same apparatus on a plane perpendicular to the view of FIG. 1.

Referring to FIG. 1 of the drawing, the invention will be further described. Aqueous waste, (waste water) either untreated or after preliminary sedimentation or skimming treatments, is introduced into aeration basin 11 via conduit 10. Basin 11 is filled to a liquid level 12 with a suspension of activated sludge in aqueous waste. The concentration of activated sludge is about 2,000 mg per liter. This biologically active sludge is mixed with the waste and aerated by rotary mixers 14a and 14b. Other equivalent types of mixing devices may be employed if desired.

Basin 11 is sized to provide a mean waste residence time of from about 1 to about 10 hours. These times are generally adequate for the bacteria in the sludge to effectively reduce the organic contaminant level of the aqueous waste from a usual feed concentration of about 2,000 mg/l B.O.D. 5 to a usual discharge concentration of 75 mg/l B.O.D. 5. If an especially heavily contaminated or difficult to degrade stream is fed a larger basin, giving a longer residence time, may be called for. The shape of basin 11 is not critical, it may be round, rectangular or irregular in shape. It must be of sufficient depth, however, say 10–20 feet, to permit full submersion of the flotation cells as herein described. The treated waste water is separated from the suspended activated sludge in accordance with the present invention as follows:

A stream of treated clarified water is obtained, either from an external source or, as shown, from the flotation cells of the invention as clarified waste water. In In FIG. 1, this clarified waste is removed directly from the flotation cell 21 and from basin 11 via conduit 15. A gas, preferably air, is added to the clarified water via conduit 16 and the mixture is compressed by pump 17 to a pressure generally of from about 5 psig to about 100 psig. If desired, the compressed mixture may then be passed to a holding tank (not illustrated) for up to about a minute before being injected into the flotation cell. This holding tank promotes dissolving of the air in the pressurized liquid. The compressed mixture is conducted through conduit 19 and injected into eductor 20. Eductor 20 opens into flotation cell 21, and draws unclarified suspension through conduit 13 into the clarifiers from the bulk of liquid in basin 11 as the pressurized water is injected. About 50 gallons of unclarified waste is drawn in by every 100 gallons of clarified water. Equivalent means for mixing clarified and unclarified streams and charging them to the flotation cell may be used. Flotation cell 21 is wholly within basin 11. The flotation cell is positioned so that its top is beneath the surface of the liquid in basin 11, i.e., beneath liquid level 12. The injected suspension expands in open-topped cell 21 releasing small bubbles of air which rise as the injected liquid moves through cell 21. As these bubbles rise, they carry the suspended particles of activated sludge upward out of cell 21 as a froth of air and sludge. This froth is in effect directly recycled as soon as it leaves cell 21 into the remainder of basin 11. Treated effluent, freed of suspended sludge, is removed from cell 21 out through basin 11 via conduit 22.

As herein described, flotation has been achieved by injecting gas-containing liquid into the flotation cell. Of course, other equivalent means of flotation can be used, so long as the cell itself is positioned within the treatment basin, for example, air along can be injected, or bubbles can be created by impellers.

In this figure a single rectangular flotation cell is illustrated. The volume of the flotation cell is related to the volume of solids being removed, it generally should be from about 5 percent to about 25 percent of the volume of the aeration basin. Multiple cells may be suitably employed. The design of the flotation cells may vary as is known in the art. They may be rectangular, round, or of any other suitable configuration.

Referring now to FIG. 2, a cross-sectional view of the purifier of FIG. 1 at about line (a), a line perpendicular to the view of FIG. 1, the relationship of the flotation cell to the areation basin is shown in further detail. The identification numerals in this figure correspond to those in FIG. 1. Aqueous waste is introduced into aeration basin 11 via conduit 10. Liquid level of waste water and activated sludge floc is maintained at about level 12. The suspension is maintained by agitator 14A.

In operation as described in FIG. 1, clarified waste under pressure and with added air is injected via eductor 20 into flotation cell 21. The position and configuration of cell 21 is illustrated in this figure. Cell 21 is wholly beneath the liquid surface 12. It has sloping sidewalls, narrow at the top, and is open at the top for the floated suspension of bacterial floc to escape. If desired, louvers or similar gratings could be placed over the top of cell 21 to eliminate any disturbance of the flotation cell liquid by agitator 14a. As excess bacterial matter builds up, it may be removed from the surface of the basin using conventional means, for example, revolving skimmer pipes or roll or belt skimmers.

I claim:

1. An apparatus for biologically treating aqueous organically-contaminated waste comprising in combination 1. an aeration basin containing a pool of aqueous waste and bacterial floc and having means for supplying aqueous waste thereunto and agitaion means located at the surface of the pool for ultimately contacting the waste, bacterial floc and air and
    2. an open-topped flotation vessel positioned within the aeration basin entirely beneath the surface of the pool, said flotation vessel having a recycle inlet end and a discharge end and being provided with a. a discharge outlet positioned at the discharge and opposite a recycle inlet, said discharge outlet adapted to discharge clarified liquid from the flotation vessel and outside the aeration basin and b. a recycle conduit connected to said flotation vessel at the discharge outlet end and provided in flow sequence with an air inlet line, an inline pump, and an eductor, said inline pump and air inlet line being located outside the basin and said eductor being located within the basin, said recycle conduit opening into said flotation vessel through the recycle inlet, said eductor serving to draw unclarified suspension from the basin into the flotation vessel.

* * * * *